United States Patent [19]

Ohtomo et al.

[11] Patent Number: 5,751,408
[45] Date of Patent: May 12, 1998

[54] SURVEYING APPARATUS

[75] Inventors: Fumio Ohtomo; Yoshikatsu Tokuda, both of Tokyo, Japan

[73] Assignee: Kabushiki Kaisha Topcon, Tokyo, Japan

[21] Appl. No.: 492,584

[22] Filed: Jun. 20, 1995

[30] Foreign Application Priority Data

Jun. 21, 1994 [JP] Japan ................... 6-138620

[51] Int. Cl.$^6$ ................................................. G01C 3/08
[52] U.S. Cl. ................................................. 356/5.14
[58] Field of Search .................................... 356/5.14

[56] References Cited

U.S. PATENT DOCUMENTS

| | | | |
|---|---|---|---|
| 3,773,421 | 11/1973 | Gievers | 356/152 |
| 4,732,472 | 3/1988 | König et al. | 356/152 |
| 4,786,176 | 11/1988 | Froome | 356/373 |
| 4,830,489 | 5/1989 | Cain et al. | 356/73 |
| 5,051,934 | 9/1991 | Wiklund | 364/561 |
| 5,267,014 | 11/1993 | Prenninger | 356/152 |

FOREIGN PATENT DOCUMENTS

| | | |
|---|---|---|
| 63-259411 | 10/1988 | Japan. |
| 4-313013 | 11/1992 | Japan. |
| 7-134026 | 5/1995 | Japan. |

OTHER PUBLICATIONS

Abstract—Japanese Doc. No. 4-313013.

Primary Examiner—Mark Hellner
Attorney, Agent, or Firm—Finnegan, Henderson, Farabow, Garrett & Dunner, L.L.P.

[57] ABSTRACT

There is provided a surveying apparatus for detecting an object reflector (102) and measuring a distance from the object reflector (102) based on a luminous flux reflected by the object reflector (102) by irradiating a luminous flux toward the object reflector which varies a direction of polarization of reflected rays relative to that of incident rays. The surveying apparatus includes a light source section (106) for radiating the luminous flux as a luminous flux having a predetermined direction of polarization; an irradiating optical system (101) for irradiating the luminous flux from the light source section (106) toward the object reflector (102); a polarizing optical element (122) for dividing a polarized/reflected luminous flux of which direction of polarization has been varied when reflected by the object reflector (102); a first light-receiving section (124, 126) for receiving the polarized/reflected luminous flux divided by the polarizing optical element (122); a second light-receiving section (120) for receiving the reflected luminous flux reflected by the object reflector (102); a detecting section (104) for detecting the object reflector based on an output signal from the first light-receiving section (124, 126); and a distance measuring section (131) for measuring the distance from the object reflector (102) based on an output signal from the second light-receiving section (120).

12 Claims, 16 Drawing Sheets

FIRST
PHOTOELECTRIC
DETECTOR <A>

SECOND
PHOTOELECTRIC
DETECTOR <B>

WAVE FORM FOR
DETECTING THE
CENTER OF THE
REFLECTING SECTION
<A-B>   (HOWEVER,
(a) IS A WAVE FORM
OF <A> ITSELF)

SURVEYING APPARATUS

BACKGROUND OF THE INVENTION

1. Field of the Invention

The present invention relates to a surveying apparatus for detecting an object reflector and measuring a distance from the object reflector based on a luminous flux reflected by the object reflector by irradiating a luminous flux toward the object reflector which varies a direction of polarization of reflected rays relative to that of incident rays.

The present invention also includes a rotational laser used in a rotational laser marking instrument in which a laser beam is irradiated to the object reflector and an irradiated point of the object reflector is used as a reference position, or used in other rotationally irradiating types of laser instruments.

2. Description of the Prior Art

Heretofore, there is known a surveying apparatus for detecting an object reflector and measuring a distance from the object reflector bused on a reflected luminous flux reflected by the object reflector by irradiating an irradiation luminous flux toward the object reflector.

For example, Japanese Laid-open Patent Publication No. Sho 63-259411 discloses a surveying apparatus for measuring a distance from the apparatus to an object reflector in which it has a transmitter and a receiver and is adapted to carry out the distance measurement by forming a laser reference plane by rotating a laser luminous flux, detecting two object reflectors arranged spaced apart from each other, and obtaining a pulse interval between two pulses formed by the reception of the laser luminous flux reflected by the two object reflectors. In addition, it also discloses to measure a distance by modulating a laser beam and measuring a phase difference between the modulated signal and a signal obtained by demodulating the reflected laser energy In addition, Japanese Laid-open Patent Publication No. Hei 4-313013 discloses an arrangement in which a phase difference type of light-wave distance meter is adapted to be incorporated to a surveying apparatus forming a laser reference plane with the rotation of the laser luminous flux.

However, such a conventional surveying apparatus has a drawback in that it lacks the reliability of the marking of the reference plane and the distance measurement because it often causes an introduction of outside light into a light-receiving section and thus causes a misunderstanding of the introduced outside light as if it were reflected by the object reflector.

SUMMARY OF THE INVENTION

It is therefore an object of the present invention to provide a surveying apparatus which can improve the reliability of the marking of the reference plane and the distance measurement.

In order to achieve the object, there is provided a surveying apparatus for detecting an object reflector and measuring a distance from the object reflector based on a reflected luminous flux reflected by the object reflector by irradiating an irradiation luminous flux toward the object reflector which varies a direction of polarization of reflected rays relative to that of incident rays. The surveying apparatus comprises a light source section for radiating the irradiation luminous flux as a luminous flux having a predetermined direction of polarization; an irradiating optical system for irradiating the irradiation luminous flux from the light source section toward the object reflector; a polarizing optical element for separating a polarized/reflected luminous flux of which direction of polarization has been varied when reflected by the object reflector; a first light-receiving section for receiving the polarized/reflected luminous flux divided by the polarizing optical element; a second light-receiving section for receiving the reflected luminous flux reflected by the object reflector; a detecting section for detecting the object reflector based on an output signal from the first light-receiving section; and a distance measuring section for measuring the distance from the object reflector based on an output signal from the second light-receiving section.

Further, in order to achieve the object, there is provided a surveying apparatus for detecting an object reflector and measuring a distance from the object reflector based on a reflected luminous flux reflected by the object reflector by irradiating an irradiation luminous flux toward the object reflector of which reflecting surfaces are formed by two polarizing elements having different polarizing characteristics and which varies a direction of polarization of part of incident rays. The surveying apparatus comprises a light source section for radiating the irradiation luminous flux as a polarized/irradiating luminous flux having a predetermined direction of polarization; a radiating optical system for radiating the polarized/irradiating luminous flux toward the object reflector; a beam splitter for dividing the reflected luminous flux reflected by the object reflector into a first polarized luminous flux having one direction of polarization and a second polarized luminous flux having the other direction of polarization; a first light-receiving section for receiving the first polarized luminous flux divided by the beam splitter; a second light-receiving section for receiving the second polarized luminous flux divided by the beam splitter; a third light-receiving section for receiving the polarized/reflected luminous flux without through the beam splitter; a detecting section for detecting the object reflector based on output signals from the first and second light-receiving sections; and a distance measuring section for measuring the distance from the object reflector based on an output signal from the third light-receiving section.

Furthermore, in order to achieve the object, there is provided a surveying apparatus for detecting an object reflector and measuring a distance from the object reflector based on a reflected luminous flux reflected by the object reflector by irradiating an irradiation luminous flux toward the object reflector which varies a direction of polarization of reflected rays relative to that of incident rays. The surveying apparatus comprises a first light source section for radiating a luminous flux having a predetermined direction of polarization in order to detect the object reflector; a second light source for radiating an irradiation luminous flux having a wavelength longer than that of the first light source in order to measure a distance from the object reflector; an irradiating optical system for irradiating the irradiation luminous fluxes from the first and second light source sections toward the object reflector; a wavelength separating element for separating the reflected luminous flux having the wavelength of the first light source section and the reflected luminous flux having the wavelength of the second light source section from each other; a polarizing optical element for separating a polarized/reflected luminous flux of which direction of polarization has been varied when reflected by the object reflector from the reflected luminous flux having the wavelength of the first light source section divided by the wavelength separating element; a first light-receiving section for receiving the polarized/reflected luminous flux divided by the polarizing optical element; a second light-receiving section for receiving the reflected luminous flux having the wavelength of the light source sections; a detecting section for detecting the object reflector based on an output signal from the first light-receiving section; and a distance measuring section for measuring the distance from the object reflector based on an output signal from the second light-receiving section.

DESCRIPTION OF THE PREFERRED EMBODIMENTS

Some embodiments of a surveying apparatus of the present invention will be hereinafter described with reference to the accompanying drawings.

(First Embodiment)

A first embodiment will be described on the assumption that a laser luminous flux irradiated to an object reflector (hereinafter referred to as "reflecting section") 102 is used as fluxes of light both for distance measurement and for data communication and that a rotational section 101 is directed to the reflecting section 102.

[Arrangement of the Apparatus]

Figure 1:
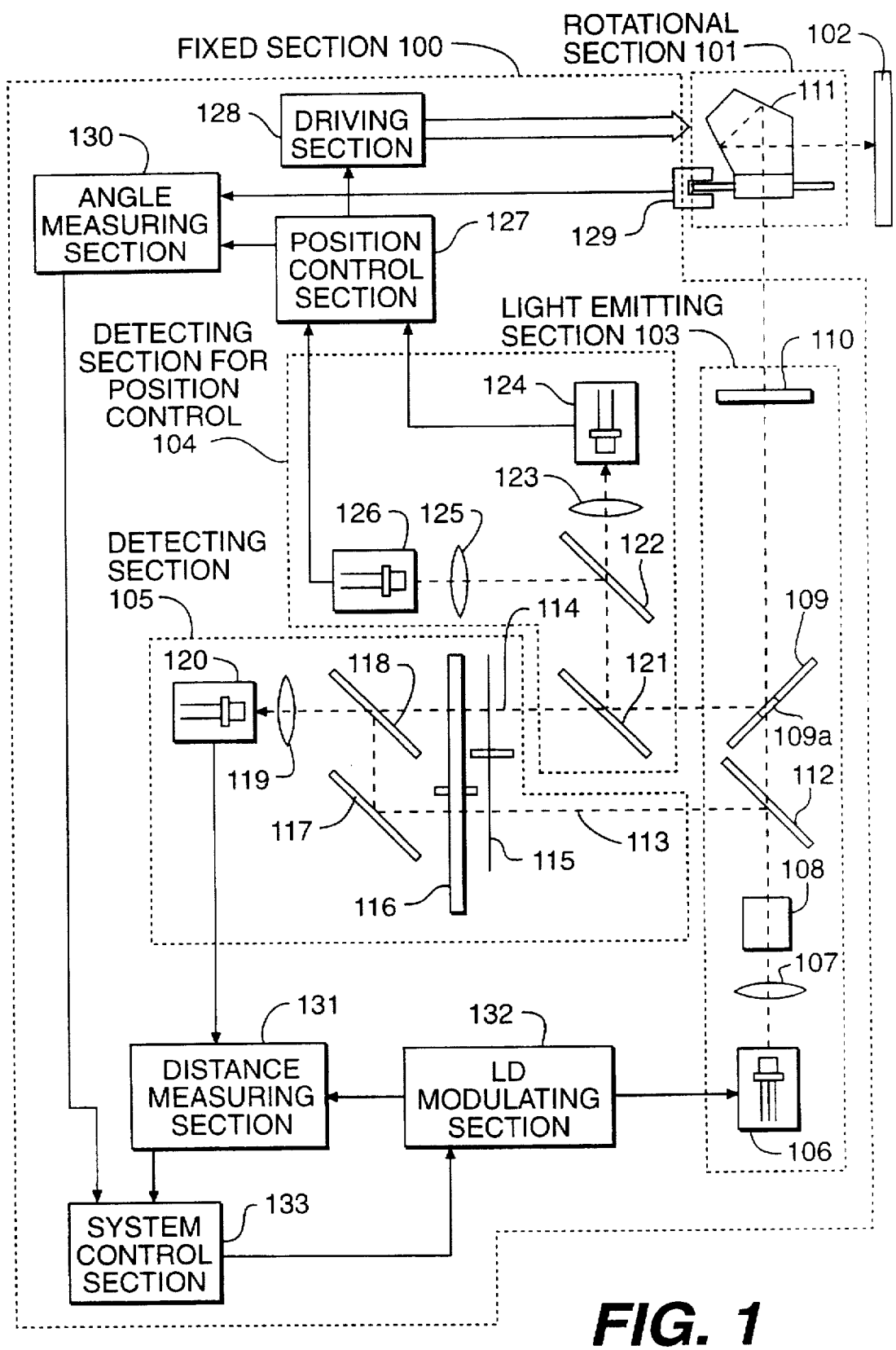
FIG. 1 is a schematic view showing an optical system of the surveying apparatus according to first and second embodiments of the present invention.

As shown in FIG. 1, the surveying apparatus (rotational laser apparatus) has a fixed section 100 and a rotational section 101. The fixed and rotational sections 100 and 101 constitute a body section. The reflecting section 102 is separated from the body section.

The rotational section 101 is rotatably supported on the fixed section 100 and functions as an irradiating optical system. The fixed section 100 is constituted of a light emitting section 103, a detecting section for position control 104, a detecting section for distance measurement 105, an encoder 129, and other control circuits.

The light emitting section 103 is constituted of a collimator lens 107, an inclined angle compensation section 108, a half mirror 112, an apertured mirror 109, and a λ/4 double refraction element 110 which are arranged on the optical axis of a laser diode (light source section) 106 in order of mention. The luminous flux of the laser diode 106 is used not only as a rotational laser beam for marking a horizontal reference plane, but as a measuring flux of light for measuring a linear horizontal distance from the body section to the reflecting section 102 by irradiating it to the reflecting section 102.

The inclined angle compensation section 108 comprises, for example, a liquid type compensator using the reflection by a free liquid surface and acts to vertically compensate the luminous flux radiated from the light source 106 when the optical axis of the laser diode 106 is not vertical.

The half mirror 112 acts to form an inside optical path 113 necessary for eliminating instability factors within the body section when measuring the distance. Since a number of electronic parts used within the apparatus sometimes cause the change of time delay due to temperature change and thus errors in measurement, it is necessary to measure a distance measuring optical path 114 (hereinafter described more in detail) and the inside optical path 113 and to obtain the difference in measured values in order to eliminate the instability factors within the body section common to the optical paths 114 and 113.

The apertured mirror 109 has an aperture 109a through which the luminous flux radiated from the laser diode 106 passes. The apertured mirror 109 reflects a luminous flux reflected by the reflecting section 102 toward the detecting section for position control 104 and the detecting section for distance measurement 105. The λ/4 double refraction element 110 changes a linearly polarized laser beam incident thereupon into a circularly polarized beam of light and then radiates it.

The detecting section for position control 104 comprises a half mirror 121 mounted on the reflecting optical axis of the apertured mirror 109, a polarized beam splitter 122 mounted on the reflecting optical axis of the half mirror 121, a condenser lens 123 mounted on the reflecting optical axis of the half mirror 121, a first photoelectric detector 124 mounted on the reflecting optical axis of the half mirror 121, a condenser lens 125 mounted on the reflecting optical axis of the polarized beam splitter 122, and a second photoelectric detector 126 mounted on the reflecting optical axis of the polarized beam splitter 122.

The half mirror 121 divides the reflected luminous flux reflected by the reflecting section 102 into a flux of light for position control and a flux of light for distance measurement. As hereinafter described, since the reflected luminous flux from the reflecting section 102 changes its direction of polarization due to the difference of the irradiated positions on the reflecting section 102, it is necessary to divide the polarized fluxes of light by means of the polarized beam splitter 122 and distinguish them. The first and second photoelectric detectors 124 and 126 are adapted to receive and detect luminous fluxes divided into two polarized components by means of the polarized beam splitter 122, respectively.

The detecting section for distance measurement 105 comprises a half mirror 118, a condenser lens 119, a photoelectric detector for distance measurement 120, which are mounted on the reflecting optical axis of the apertured mirror 109 in order of mention, and a mirror 117 mounted on the reflecting optical axis of the half mirror The inside optical path 113 is an optical path from the half mirror 112 to the photoelectric detector for distance measurement 120 through the mirror 117 and the half mirror 118. The distance measuring optical path 114 is an optical path from the reflecting section 102 to the photoelectric detector for distance measurement 120 through a pentagonal prism 111, the λ/4 double refraction element 110, the apertured mirror 109, and the half mirror 121. An optical path switch 115 and a light amount controller 116 are each mounted on both of the inside optical path 11S and the distance measuring optical path 114.

The half mirror 118 transmits the reflected luminous flux following the distance measuring optical path 114 and leads it to the photoelectric detector for distance measurement 120. The half mirror 118 also reflects the luminous flux reflected by the mirror 117 and following the inside optical path 113 and leads it to the photoelectric detector for distance measurement 120. In order to sufficiently receive the reflected light from the object reflector 102 and obtain a distance measuring signal at a higher level, a polarizing optical element, such as a polarizing filter, is not disposed on the distance measuring optical path 114. The optical path switch 115 changes over the distance measuring optical path 114 and the inside optical path 113 to each other. The light amount controller 116 controls the amount of light of each luminous flux traveling along the inside optical path 113 and the distance measuring optical path 114. The encoder 129 detects a rotational angle of the irradiating direction of the laser beam relative to a reference direction. The fixed section 100 further includes several kinds of controlling circuits.

A position control section 127 detects the position of the reflecting section 102 based on a light receiving signal from the detecting section for position control 104 and then outputs a position detecting signal to an angle measuring section 130 and, at the same time, outputs a rotation control signal for controlling the rotation of the rotational section 101 to a driving section 128. The driving section 128 controls the rotation and stop of the rotational section 101 based on the rotation control signal. The angle measuring section 130 measures a horizontal angle of the reflecting section 102 base on a position detecting signal output by the position control section 127 and a pulse signal output by the encoder 129. An LD modulating section 132 has an oscillator used as a reference when measuring the distance and modulates the laser diode 106 for carrying out the distance measurement and the data communication. The distance measuring section 131 measures the distance based on a light receiving signal from the detecting section 105 and a signal output by the reference oscillator of the LD modulating section 132. A system control section 133 controls the operational timing of the whole apparatus and carries out various kinds of data processing based on the results of the measurement.

The rotational section 101 is driven by the driving section 123 and comprises rotational portions of the pentagonal prism 111 and the encoder 129. The pentagonal prism 111 swings or rotates around a vertical optical axis passing through the inclined angle compensation section 108 and acts to change the vertical optical axis horizontally.

Figure 2:
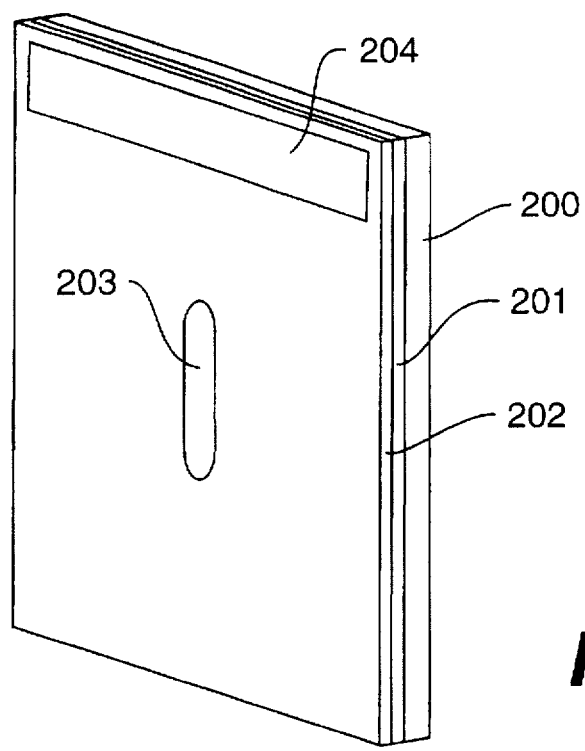
FIG. 2 is a perspective view showing one example of the object reflector according to the present invention.
Figure 3:
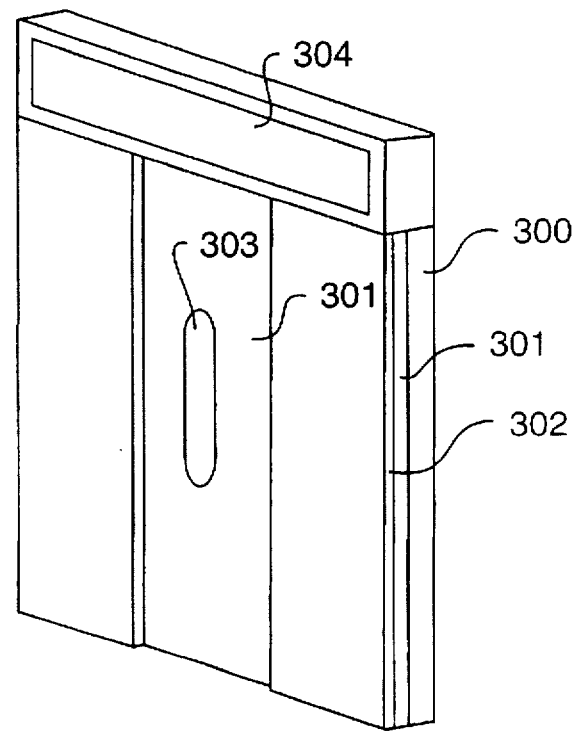
FIG. 3 is a perspective view showing another exemplary illustration of the object reflector according to the present invention.
Figure 4:
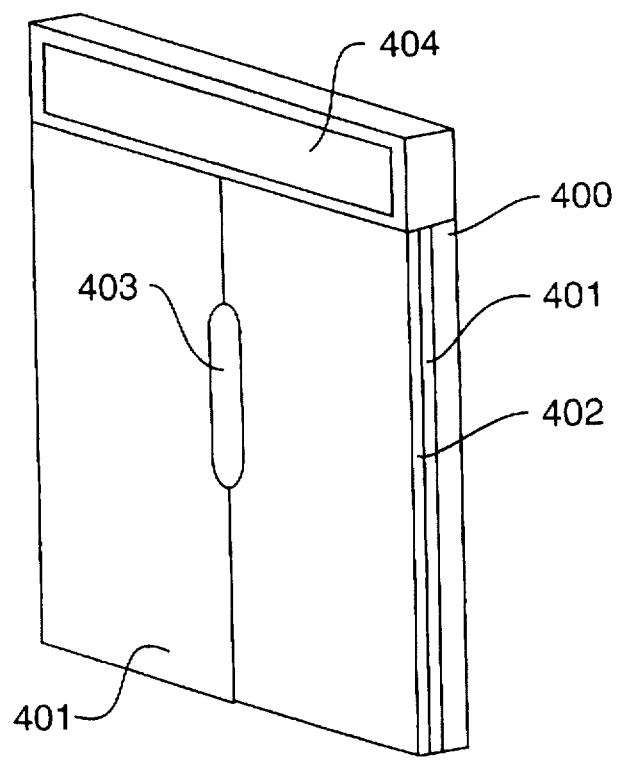
FIG. 4 is a perspective view showing still another exemplary illustration of the object reflector according to the present invention.

As shown in FIG. 2, 3 or 4, the reflecting section 102 comprises a substrate 200, 300, or 400, a reflecting plate 201, 301, or 401, a double refraction element 202, 302, or 402, a data-light receiving portion 203, 303, or 403, and a data displaying portion 204, 304, or 404. The substrate 200, 300, or 400 includes an electronic circuit for receiving the data sent from the body section The reflecting plate 201, 301, or 401 is formed by a recursive reflecting member in which a plurality of micro corner cubes or spherical reflectors are arranged. The double refraction element 202, 302, or 402 provide a λ/4 phase difference relative to the incident luminous flux. The data-light receiving portion 203, 303, or 403 and the data displaying portion 204, 304, or 404 act to receive and display the measured data transmitted from the body section via optical communication. The fundamental structure of the reflecting section 102 comprises the substrate 200, 300, or 400, the reflecting plate 201, 301, or 401, and the double refraction element 202, 302, or 402. When the data communication is not carried out, the data-light receiving portion 203, 303, or 403 and the data displaying portion 204, 304, or 404 may be excluded.

When the laser beam of circularly polarized light enters a position where the double refraction element is situated, it is converted to a beam of linearly polarized light by the double refraction element and then is reflected by the reflecting plate 201, 301, or 401 and again enters the double refraction element 202, 302, or 402 so as to become a beam of circularly polarized light opposite in direction, and enters the pentagonal prism 111 of the body portion On the other hand, when the laser beam of circularly polarized light enters a position where the double refraction element is not situated, the direction of polarization of the circularly polarized light is maintained by the reflecting plate 201, 301), or 401 and again enters the pentagonal prism 111 of the body section

[Operation of the Body Section]

The operation of the surveying apparatus (rotational laser apparatus) will be described.

(Detecting Method)

A method of detecting the object reflector in this embodiment is substantially the same as that disclosed in Japanese Patent Application No. Hei 5-231522.

The direction of polarization of the irradiation luminous flux radiated from the body section is beforehand determined. The irradiation luminous flux passes through the double refraction element 202, 302, or 402 of the reflecting section 102, is reflected by the reflecting plate 201. 301 or 401, and returns again to the body section through the double refraction element 202, 302 or 402. The polarized/reflected luminous flux returned to the body section passes through the polarized beam splitter 122 disposed before the first photoelectric detector 124.

The first photoelectric detector 124 outputs a light-receiving signal based on the luminous flux of which the direction of polarization has been changed by the double refraction element 202, 302 or 402. The second photoelectric detector 126 outputs a light-receiving signal based on the reflected/polarized luminous flux maintaining the direction of polarization of the irradiation luminous flux irradiated from the body section. Accordingly, the combination of the output of the first photoelectric detector 124 and the output of the second photoelectric detector 126 has a certain specified pattern when the luminous flux irradiated from the body section crosses the reflecting section 102. Thus, it is possible to determine whether the luminous flux is from the reflecting section 102 or not by detecting the output patterns of the first and second detectors 124 and 126.

Figure 5C:
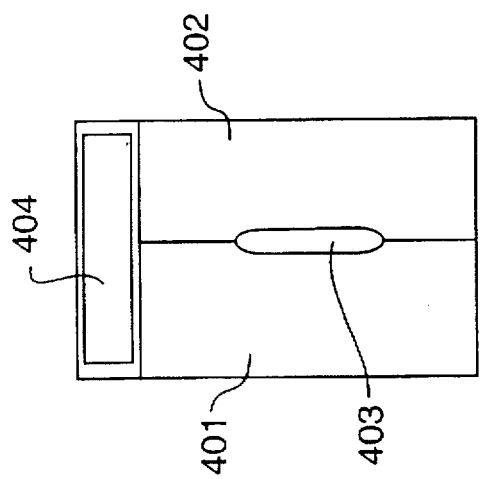
FIGS. 5A–5F are a graphic illustration showing patterns of light-receiving outputs based on the polarized/reflected luminous flux from the reflecting section according to the present invention.
Figure 5B:
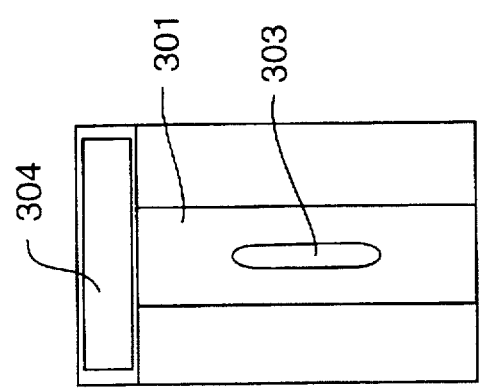
Figure 5A:
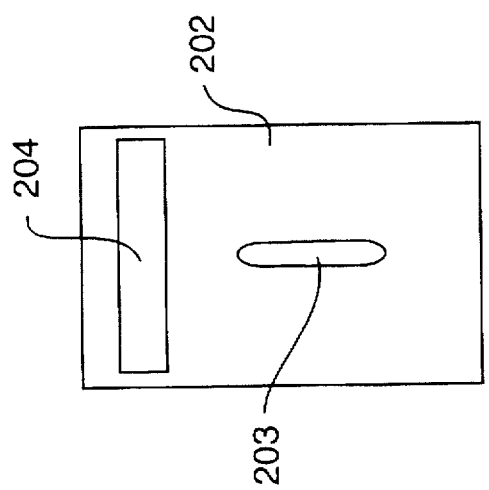
Figure 5D:
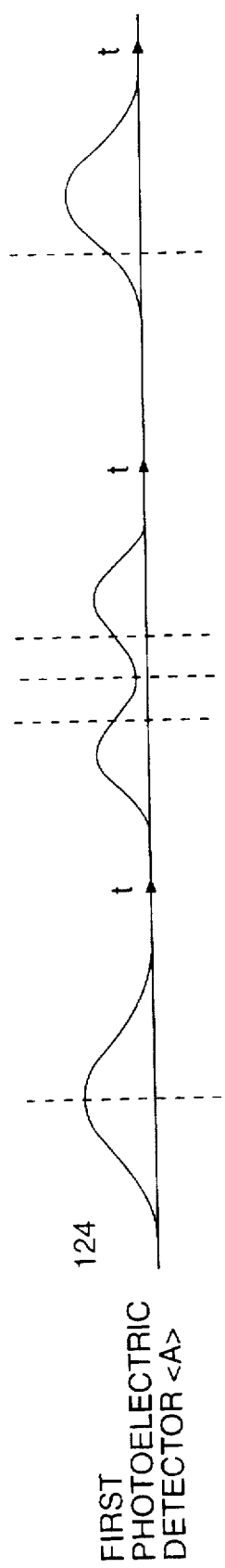
Figure 5E:
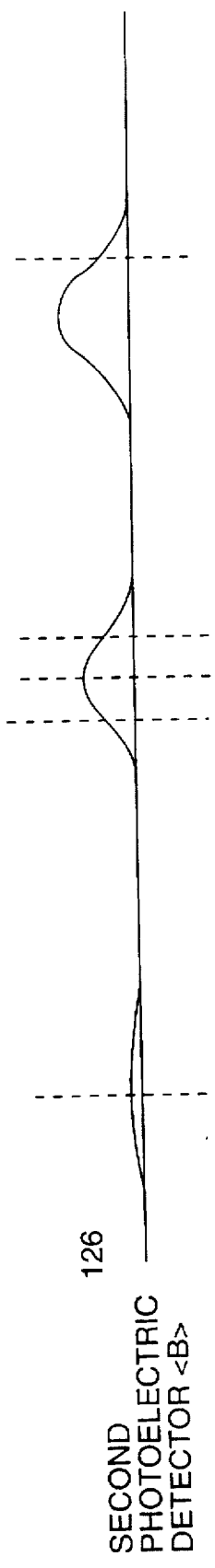
Figure 5F:
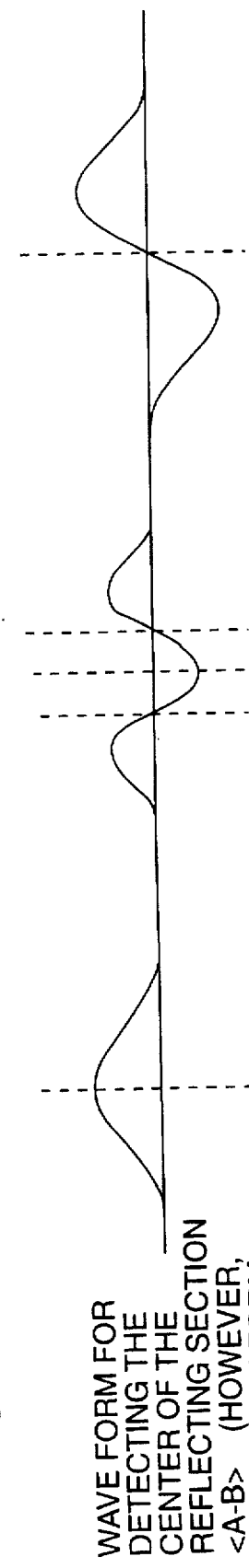

FIGS. 5A–5F show patterns of a light-receiving output based on the polarized/reflected luminous flux from the reflecting section 102, wherein FIG. 5A is a light-receiving output pattern in case of the reflecting section 102 being structured as in FIG. 2. FIG. 5B is a light-receiving output pattern in case of the reflecting section 102 being structured as in FIG. 3, and FIG. 5C is a light-receiving output pattern in case of the reflecting section 102 being structured as in FIG. 4. In FIG. 5D–5E and <A> and <B> show light-receiving outputs of the first and second photoelectric detectors 124 and 126, respectively.

Referring to (a) of FIG. 5A, the light-receiving output <A> or the first photoelectric detector 124 is large because of the double refraction elements 202 covering the whole surface of the reflecting section 102, while the light-receiving output <B> of the second photoelectric detector 12G is very small.

Referring to FIG. 5B, the light-receiving output <A> of the first photoelectric detector 124 has a waveform having two peaks because the reflecting section 102 has the double refraction element 302 at both sides thereof and the middle thereof is naked. On the other hand, the light-receiving output <B> of the second photoelectric detector 126 has a waveform having a peak at the center of the two peaks of the light-receiving output <A> on the time base.

Referring to of FIG. 5C, it has the double refraction element 402 at one side and the reflecting plate 401 at the other side. Accordingly, the respective peaks of the waveforms of the light-receiving output <A> of the first photoelectric detector 124 and the light-receiving output <B> of the second photoelectric detector 126 do not coincide with each other on the time base.

When there arises the necessity of detecting the center of the reflecting section 102, for example, when the rotational section 101 is kept to be directed toward the reflecting section 102, it is preferable to detect the center thereof by using a waveform <A–B> obtained by subtracting the light-receiving output <B> of the second photoelectric detector 126 from the light-receiving output <A> of the first photoelectric detector 124.

In the case of FIG. 5A, since the light-receiving output <B> is substantially zero (0), it can be judged that the rotational section 101 has been directed to the center of the reflecting section 102 by detecting the peak of the light-receiving output <A>. In the case of FIG. B, since the waveform <A–B> has a minimum value, it can be judged that the rotational section 101 has been directed to the center of the reflecting section 102 when detecting the minimum value. In the case of FIG. C, since the waveform <A–B> has a maximum value (plus; "+") and a minimum value (minus; "–") which have an inverted relationship in plus and minus, it can be judged that the rotational section 101 has been directed to the center of the reflecting section 102 by detecting a point at which the value of the waveform (A–B>changes from minus (–) to plus (+).

According to the detection of the center of the reflecting section 102 under this method, if once the reflecting section 102 is detected, it is possible to trace the center of the reflecting section 102 by using the rotational section 101 regardless of the movement of the reflecting section 102 in every direction if the reflecting section 102 is within a horizontal plane including the irradiation luminous flux irradiated from the body section. If a horizontal angle of the reflecting section 102 relative to a certain reference is required, the center of the reflecting section 102 may be detected under this method so that the rotational angle of the rotational section 101 at the detection time is stored by using the pulse output of the encoder 120.

(Operation of the Apparatus)

Figure 6:
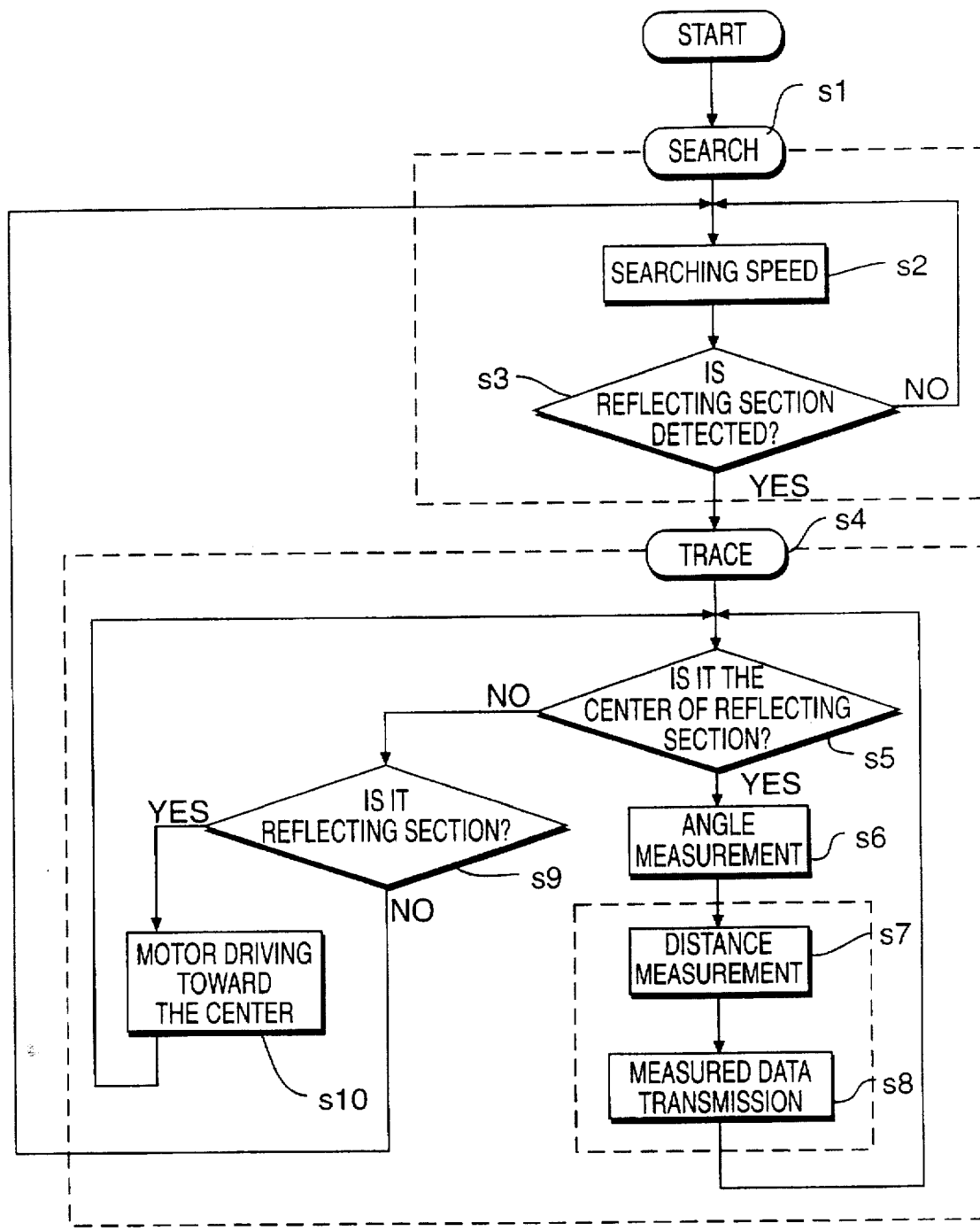
FIG. 6 is a flowchart explaining the operation of the surveying apparatus of the first embodiment.

FIG. 6 is a flowchart for explaining the operation of the apparatus.

The rotational section 101 operates at two kinds of operation modes, i.e., at a search mode and at a trace mode. The search mode is a mode for looking for the reflecting section 102 and the rotational section 101 continues to rotate in one direction in this search mode until the reflecting section 102 is found out. This operation will be hereinafter referred to as a "searching operation". The trace mode is a mode for keeping the direction of irradiation of the luminous flus irradiated from the rotational section 102 at a direction of the reflecting section 102 detected by the searching operation. During this search mode, the reflecting section 102 is searched when it is moved in a horizontal plane including the irradiation luminous flux from the rotational section 101. The distance measurement and the data transmission are carried out in this search mode.

First of all, the body section initiates the search mode to look for the reflecting section 102 (S 1). The position control section 127 in the search mode sets the rotational speed of the rotational section 101 at a predetermined rotational speed (searching speed) (B 2). Then, whether the signal from the reflecting section 102 is derived from the reflecting section 102 or not is discriminated. This operation is repeated until the reflecting section 102 can be detected (S 3). If the reflecting section 102 is detected, the body section enters to the trace mode (S 4). The termination of the rotational section 101 is carried in accordance with the detecting )method of the reflecting section previously mentioned.

In the trace mode, whether the rotational section 101 is directed to the center of the reflecting section 102 based on the position detecting signal obtained from the detecting section for position control 104 or not is discriminated (S 5) by the position control section 127. If it is directed to the center of the reflecting section 102, the distance measurement (if necessary, furthermore the angle measurement) as well as the transmission of the measured data are carried out (S 6–S 8). During the discrimination of the center of the reflecting section 102, at least the distance measuring operation and the measured data transmitting operation are repeated (S A–S 8). On the way of this operation, if the position control section 127 discriminates that the rotational section 101 does not direct to the center of the reflecting section 102, it discriminates whether the signal derived from the detecting section for position control 104 is reflected light from the reflecting section 102 (S 9). When discriminated that the signal is the reflected light from the reflecting section 102, the rotational section 101 is directed to the center of the reflecting section 102 with driving a motor (not shown) so that the signal derived from the detecting section for the position control 104 becomes a predetermined output (S 10). When discriminated that it is not the reflected light from the reflecting section 102, it returns again to the searching operation (S 2).

Having performed these steps, it is possible to trace the reelecting section 102 although it is moved during the reflecting section 102 is in the horizontal plane including the irradiation luminous flux irradiated from the body portion.

In case of presence of a plurality of the reference section 102 or in case of carrying out the measurement at a plurality of measuring points, for specifying The direction in which the reflecting section 102 resides at a first measuring point, it may be possible to compute the horizontal angle between the first measuring point and the next measuring point with storing the angle data showing a direction relative to the reference of the rotational section 101 based on The output of the encoder 129 and with using the angle data and the output of the encoder 129 at next measuring point. In this case, the value of distance measurement at the measuring point and the horizontal angle from the previous measuring point are transmitted to the reflecting section 102 as measured data.

The communication data transmitted from the body section is received at the reflecting section 102 and the data demodulation is carried out. A data receiving electronic circuit for demodulating the PSK modulated communication data is contained within the reflecting section 102.

Figure 7:
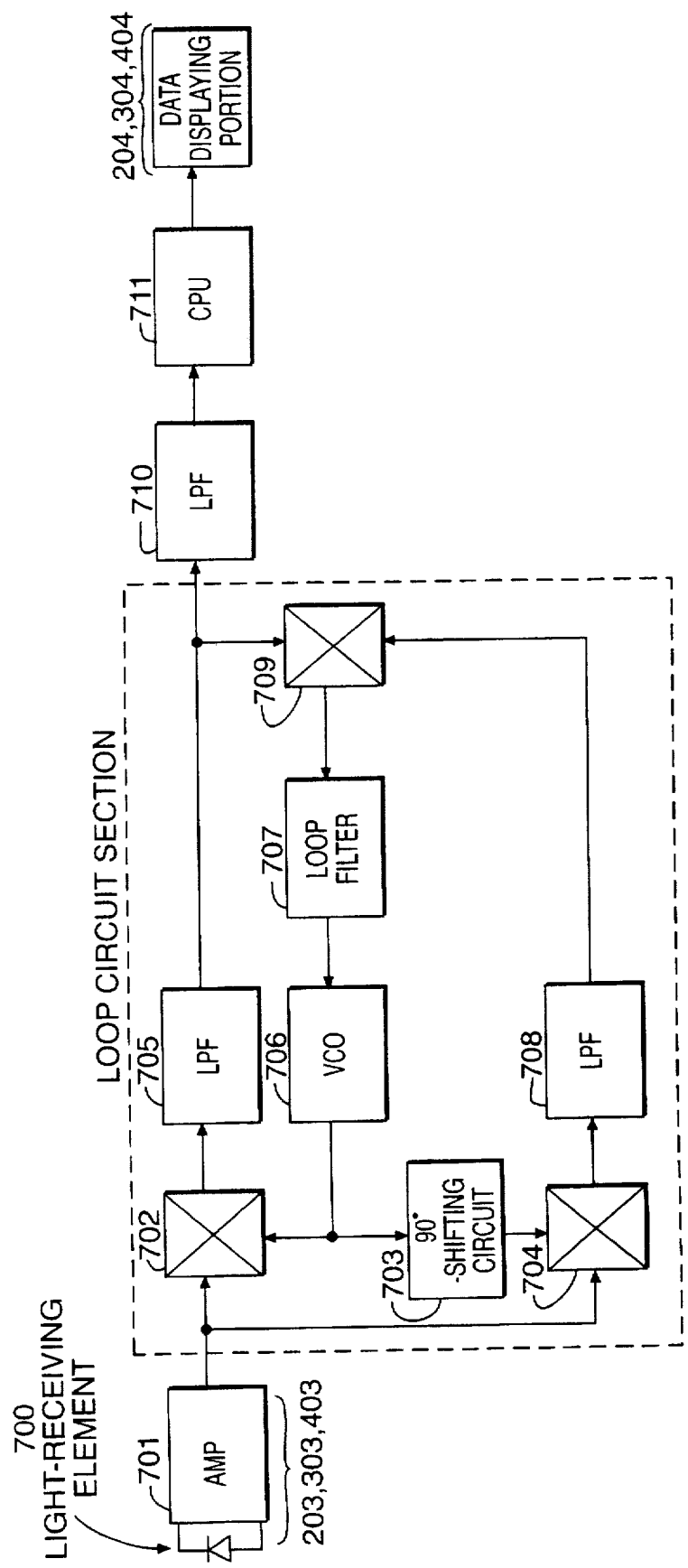
FIG. 7 is a block diagram showing a known data receiving circuit of the first embodiment.

FIG. 7 is a block diagram showing the data receiving circuit. The data receiving circuit comprises a light-receiving element 700 as a light-receiving portion 203, 303 and 403; an amplifier 701; an adding circuit 702; a low pass filter 705; an adding circuit 708; a loop filter 707; a VCO oscillation circuit 706; a 90° shifting circuit 703; an adding circuit 704; a low pass filter 708; a low pass filter 710; and a CPU 711. The adding circuit 702, the low pass filter 705, the adding circuit 709, the loop filter 707, the VCO oscillation circuit 706, the 90° shifting circuit, the adding circuit 704, the low pass filter 708 constitute a known loop circuit. The demodulated data is decoded by the CPU 711 and is displayed on the data displaying portion 204, 304 and 404 of the reflecting section 102.

(Method for Measuring the Distance)

The distance measuring method described above is a known method. Then, it will be described a method for simultaneously carrying out the distance measurement and the data transmission without the time sharing in order to improve the data transmission rate.

This distance measuring method is a method fundamentally using two wavelengths of 300 kHz and 15 MHz in which the the 300 kHz signal of a long wavelength for distance measurement is used for carrying the communication data with the PSK modulation performing the keying with the communication data. That is, since the 300 kHz signal is not a continuous modulation, the distance measurement is carried out in accordance with the following method.

First of all, the reflected light from the reflecting section 102 is converted to an electric signal by photoelectric converting means. If the frequency of the light-receiving signal is 16 MHz, it is beat down to 300 kHz, on the other hand, if it is 300 kHz, the measurement of the phase difference is carried out with keeping the signal as a signal to be measured.

Then, one cycle of the photoelectrically converted signal of 300 kHz to be measured is A/D converted to fifty (50) digital data rows with a sampling cycle of the 15 MHz output frequency of the reference signal oscillator within the body section. These digital rows are stored at fifty (50) addresses in the memory.

This A/D conversion is carried out over several cycles and is added to the old data in each address every time on conversion. During which, the address number stored with the data being added is shifted every time the phase condition of the PSK modulation is changed.

This procedure enables the PSK modulated signal to be treated as continuously modulated signals having no apparent phase variation. If integrated data obtained by adding predetermined cycles can be obtained, each value of the integrated data is equalized and then is changed to the distance data with detecting the phase difference between the signal to be measured and the reference signal in the body section using Fourier transformation by the phase detecting means. This treatment enables the feeble signals scattered by noises to be taken out.

Figure 8:
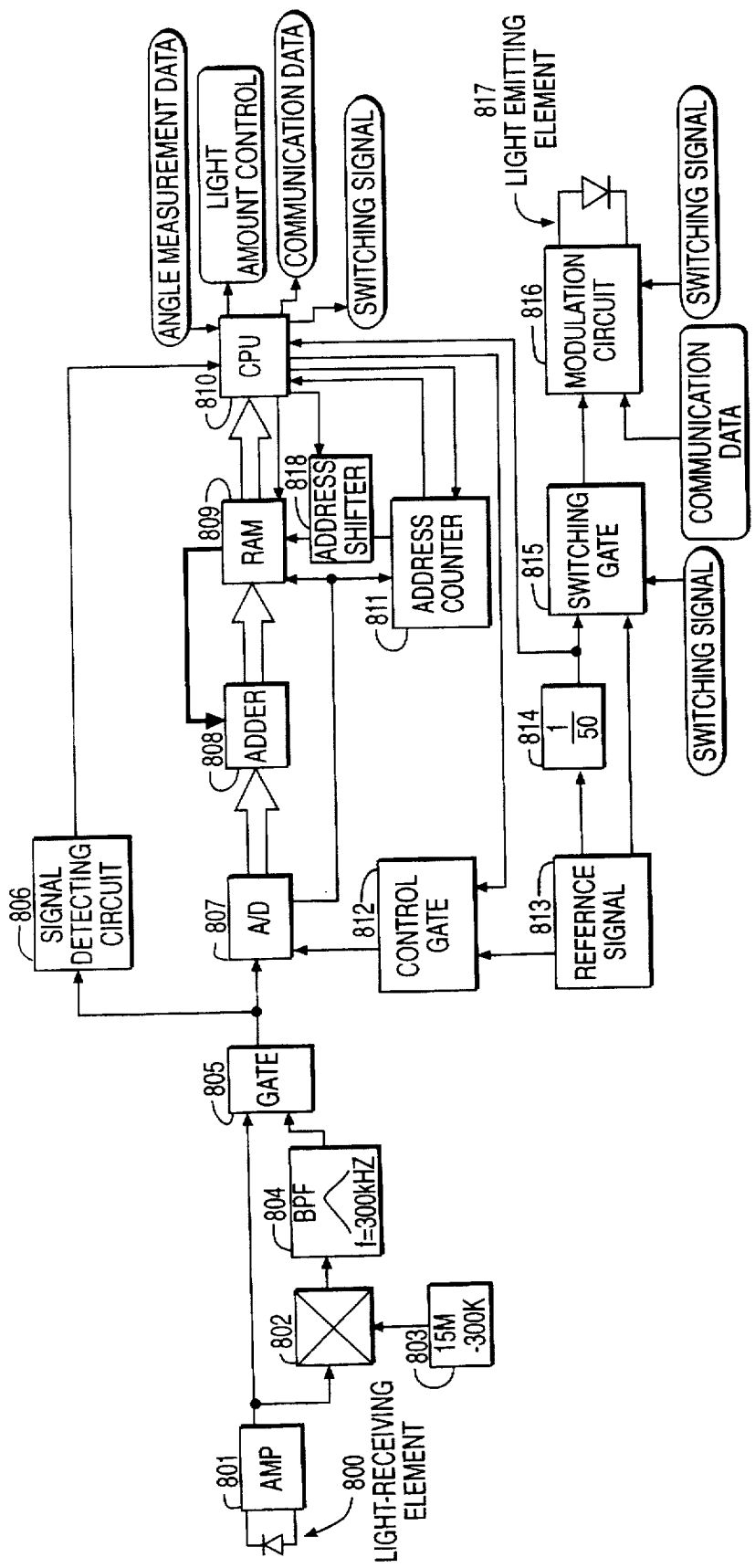
FIG. 8 is a block diagram showing a novel data receiving circuit of the first embodiment.
Figure 9A:
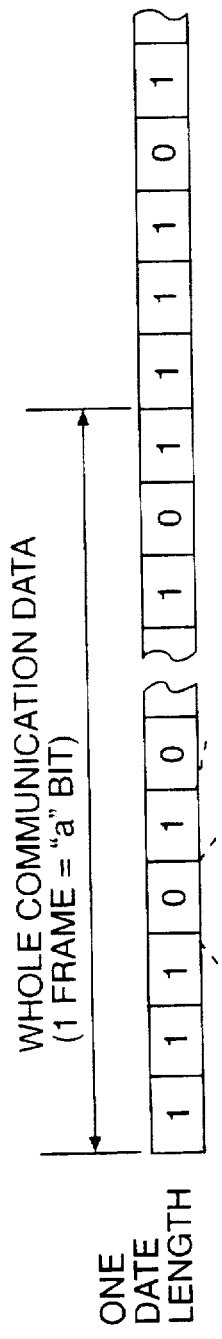
FIG. 9 is a graphic illustration showing a structure of the transmitting data and a condition of PSK modulation.
Figure 9B:
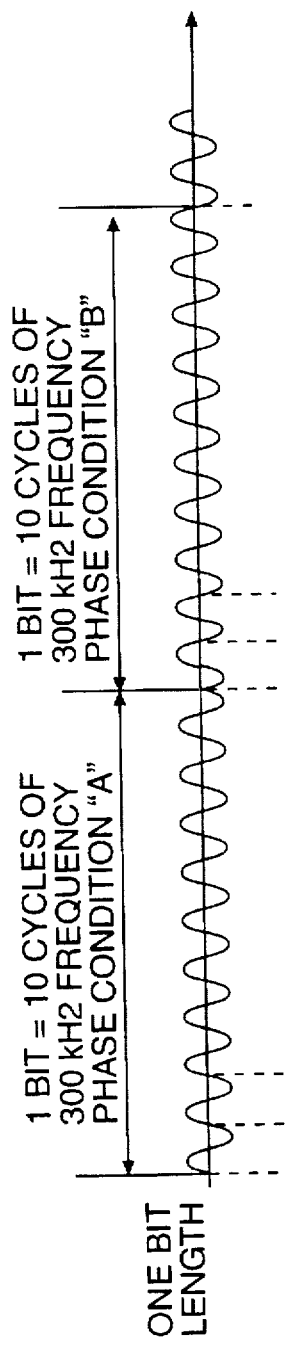
Figure 9C:
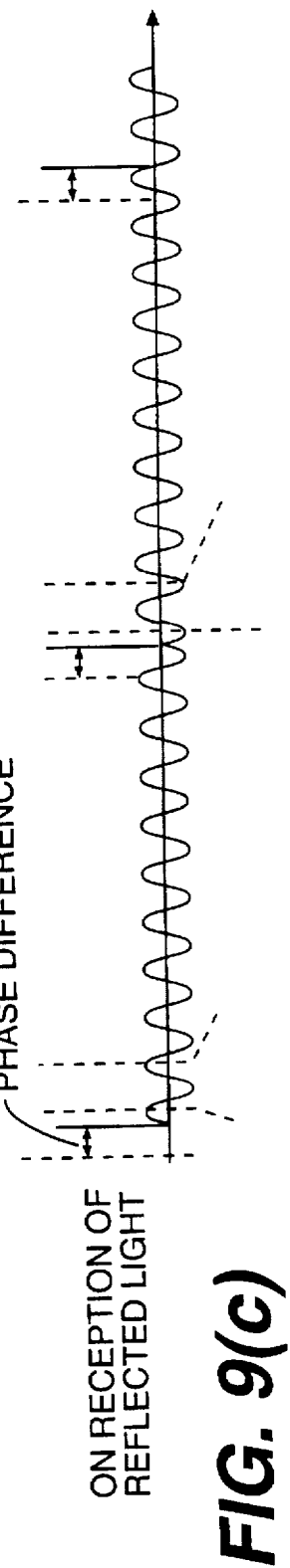
Figure 9D:
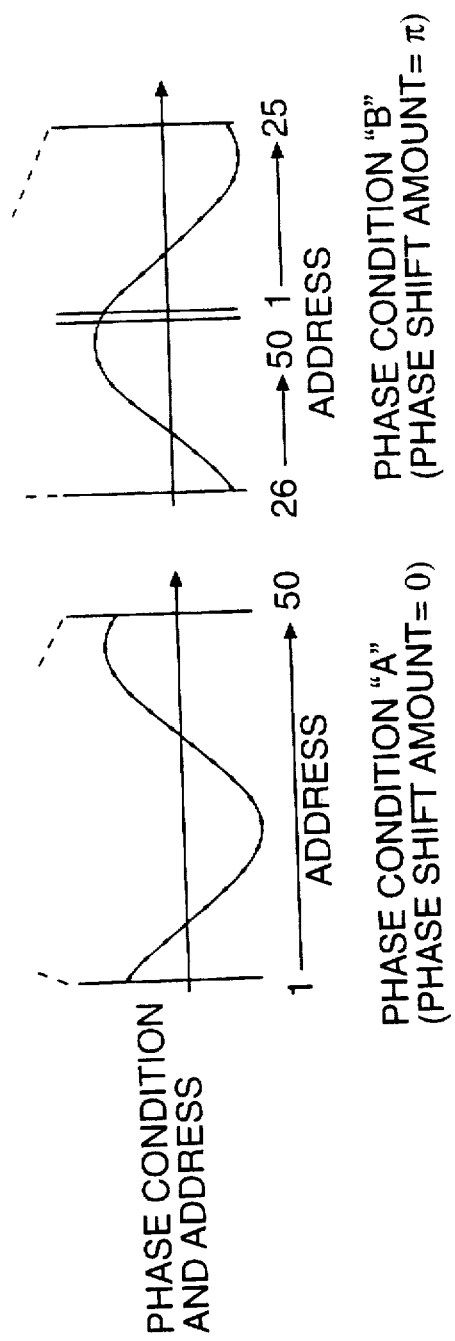

An arrangement of electrical circuit for distance measurement to realize the distance measuring method of the present invention will be hereinafter described with reference to a block diagram shown in FIG. 8.

The electrical circuit comprises a light-receiving element 800; an amplifier 801; a mixer 802; a local signal oscillator 803; a band pass filter 804; a gate 805; a signal detecting circuit 806; an A/D converter 807; an Adder 808; a random memory 809; a CPU 810; an address counter 811; a control gate 812; a reference signal oscillator 813; a counter 814; a switching gate 815; a driver 816; a light emitting element 817 (corresponding to the light source 106); and an address shifter 818.

The light emitted from the element 817 is treated either by the continuous modulation of 15 MHz by the driver circuit 816 for driving the light source, or by the PSK modulation of 300 kHz. The switching of the modulation is controlled by a frequency switching signal derived from the CPU 810. The reference signal of 15 MHz is generated by the reference signal oscillator 812. The counter 814 divides the reference signal to fifty (50) parts and forms the reference signal of 300 kHz. In the measurement of phase difference of the reflected light returned from the reflecting section 102, the frequency 15 MHz is used for the precision measurement and the frequency 300 kHz is used for the rough measurement.

The light irradiated from the body section is returned to the inside of the body with being reflected by the reflecting section 102 and then is received by the light-receiving element 800. The received luminous flux is received by the element 800 and photoelectrically converted and is then sent to the signal detecting circuit 806 and the A/D converter 807 via the gate 805 after having been amplified by the amplifier 901. The gate 806 outputs a signal inputted to the gate 805 as it is if the signal to be measured is the PSK modulation of 300 kHz, on the other hand, outputs a signal beat down to 300 kHz, if the signal to be measured is continuously modulated signal of 15 MHz. This beat down signal can be obtained by mixing the continuously modulated signal of 15 MHz with the local signal of 15 MHz~300 kHz of the local signal oscillator 803 and then is sent to the gate 805 via the band pass filter 804 having a center frequency 300 kHz.

The signal detecting circuit 806 acts to detect the light amount level of the reflected light and is formed by a synchronous detection circuit. This signal detecting circuit 806 shifts the phase of the synchronous signal in accordance with the phase condition of the PSK modulation during reception of the PSK modulated signal. The CPU 810 adjusts the light amount controller 116 so that the light amount level becomes a predetermined level. The signal sent to the A/D converter 807 is operatingly processed in accordance with a way described later by the adder 808, the random memory 809, the CPU 810, the address counter 811, the control gate 812, and the address shifter 818.

The detail of the principle of this distance measuring method will be described with reference to FIGS. 9~11.

Figure 10:
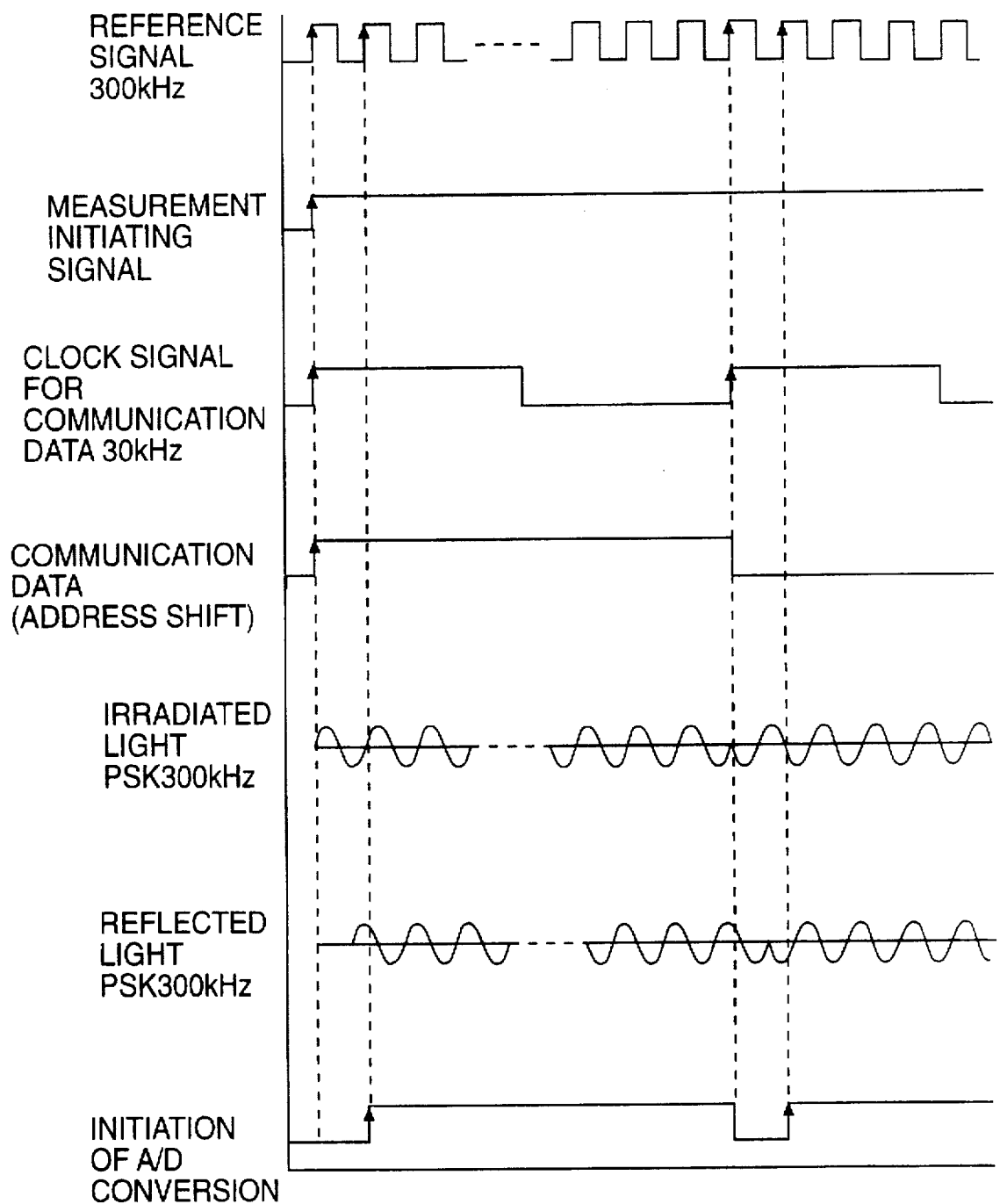
FIG. 10 is a timing chart showing the PSK modulation and the A/D conversion of the first embodiment.

FIGS. 9 and 10 are explanatory drawings showing the distance measuring method wherein the light-receiving signal is the PSK modulation of 300 kHz.

FIG. 9 shows the structure of the transmission data and the condition of the PSK modulation.

The measurement result data is converted to a digital binary signal in the CPU 810 and is transmitted to the reflecting section 102 by the PSK modulation in which the carrier is a 300 kHz signal for the rough measurement. As shown in FIG. 9 (a), the whole communication data each being constituted by "a" bit are repeatedly transmitted by predetermined times. As shown in FIG. 9 (b), one bit of the transmission data is constituted by 10 cycles of the signal of 900 kHz frequency and its phase is shifted every 10 cycles synchronized with the value of the digital binary signal of the communication data. FIG. 9 shows an example in which the phase shift amount corresponds to zero (0) when the value of the digital binary signal is "0" and also corresponds to z when the value is "1". The phase condition in which the phase shift amount is zero will be hereinafter referred to as a phase condition "A" and the phase condition in which the phase shift amount is 7 will be hereinafter referred to as a phase condition "B". The PSK modulation is thus formed by keying the reference signal of 300 kHz with the digital binary signal of the measured result data.

As shown in FIG. 9 (b), the phase of the 300 kHz carrier signal is shifted by 180° (π) when the data value is changed from "0" to "1". Accordingly, the measurement of phase difference is impossible under such a condition. Thus, on storing them in memories after the A/D conversion, they are stored with shifting the store initiating positions of the data rows within the 50 addresses in the memories accommodating with the PSK modulation.

The signal obtained by the light irradiated from the body section and reflected by the reflecting section 102 becomes a signal having a phase delayed relative to the reference signal in the body. In actual, an A/D converted value of the signal having the delayed phase is stored in the memory. FIG. 9 (d) shows a relation between the phase condition and the address to store the waveform.

The CPU 810 shifts the memory address in storing initiation between the 1st and 25th every time the value of the digital binary signal of the communication data (the keying signal for the PSK modulation for switching the phase of the carrier frequency). That is, the A/D converted values are stored in the addresses of 1st–50th when the phase condition is in "A". On the other hand, when the phase condition is in "B", after having stored the A/D converted values in the addresses orderly from 26th to 50th, it returns to the 1st address and the remaining addresses are orderly stored from the 1st to 25th thereof. The count of the address is carried out by the address counter 811 and the address after being counted is shifted by the address shifter 618 ordered by the CPU 810 as previously mentioned. This address shifter 818 is formed by an adder.

The data outputted from the A/D converter 807 is sent to the adder 808 and is added to the old data shown by the address shifter 818. This added data is then stored in the same address. Accordingly, the integration of the data is carried out with considering the PSK modulated waveform as an apparent continuous waveform by shifting the address of storing initiation according to the phase condition. From reasons later mentioned, the whole number of adding of signals per one frame of whole transmission data formed by the "a" bits becomes (9×a) times, because the 9 cycles of 300 kHz signal are added except for one cycle of 10 cycles of 300 kHz signal.

If determined number of the A/D conversion and the adding process have been completed, the data is equalized as to each address. This equalized data row is operated by Fourier transformation using the phase detecting means to detect the phase difference of the signals to be measured, from which the distance measuring optical path or the length of the optical path is obtained.

The detection of the phase difference φ is carried out as followings.

Now, the equalized data stored in each address in accordance with the procedure described above is defined as D(n), wherein the number of samples per one cycle of signal to be measured is "N", and "n" is an integer (1≦n≦N). The phase difference "φ" between the signal to be measured and the reference signal can be obtained as follows:

$$\phi = \tan^{-1}(b/a)$$

wherein $$a = \sum_{n=1}^{N} D(n) \times \sin(2\pi \times n/N)$$

$$b = \sum_{n=1}^{N} D(n) \times \cos(2\pi \times n/N)$$

In the present embodiment, N=50, and "n" is the address number. This operation corresponds to the acquirement of the phase of the fundamental wave component of the signal to be measured using Fourier transformation.

According to this method, the equalization effect is very excellent since the phase is obtained by using data which is a result of averaging of several cycles of the signal to be measured. Accordingly, it is possible to reduce the dispersion of the measured values owing to noises in signal to be measured and also possible to measure signals having very inferior S/N ratio. In addition, since the quantization error is similarly equalized, it is possible to have very high resolving power. Furthermore, since the phase measurement is carried out based on the characteristics of the fundamental component using Fourier transformation, any waveform such as a rectangular wave or triangular wave other than a sinusoidal wave may be used as the signal to be measured.

FIG. 10 shows a timing chart of the PSK modulation and the A/D conversion.

All the timings of the PSK modulation and the other data processes are synchronized with the reference signal of 300 kHz. In the PSK modulation of this embodiment, it is constructed that ten (10) cycles of carrier signal of 300 kHz constitute one bit of the communication data. Accordingly, the clock frequency of the communication data is determined as 30 kHz. That is, one clock of 30 kHz signal corresponds to one bit of the communication data. As previously mentioned, the value of the digital binary signal of the measured result data (dummy data just after the initiation of measurement) being a communication data can be used as it is for the address shifting signal of memories.

The timing of A/D conversion is determined so that it can initiate the A/D conversion after starting of clock signal of the communication data as well as every after one clock of the reference signal during a term "ON" of the measurement initiating signal. This is a measure to cut off initial portion of bit phase appearing just before the A/D conversion initiating simultaneously with the data transmission because of Phase delay of the reflected returning luminous flux relative to the reference signal. Accordingly, the A/D conversion and the adding operation of nine (9) cycles of 300 kHz signal per one bit are repeated.

Figure 11:
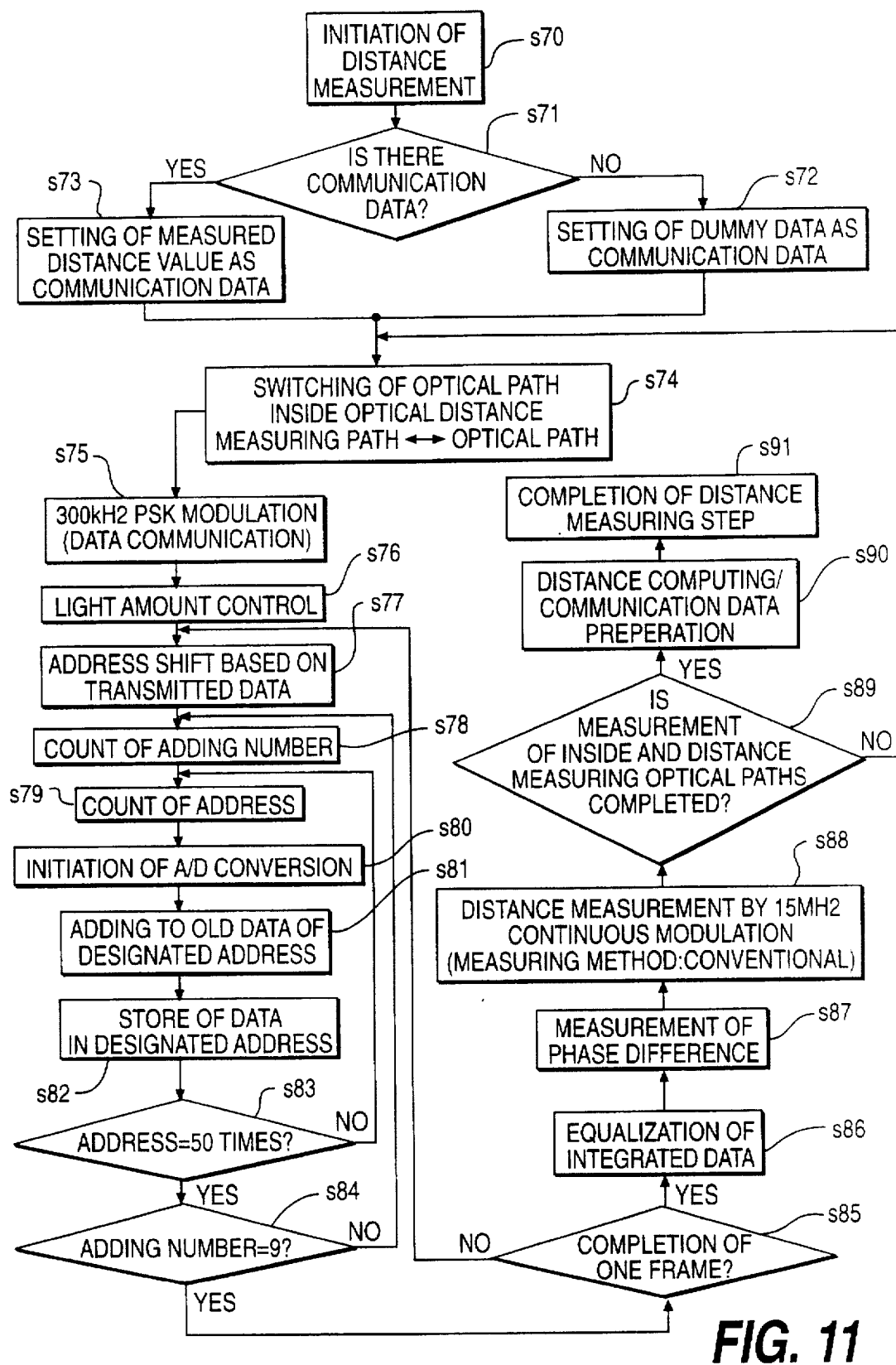
FIG. 11 is a flowchart showing the detail of the distance measuring data and the communication data of the first embodiment.

A flowchart of FIG. 11 shows a whole flow of distance measurement operation using the distance measuring principle described based on FIGS. 9 and 10.

The flow shown in FIG. 11 shows details of the distance measuring step (S 7) and the measured data transmission step (S 8) in the flowchart of FIG. 6.

Firstly, description of the distance measuring step (S 7) will be started. The CPU 810 initiates the distance measurement (S 70) and makes an examination for presence of the data of measured result and prepares the value of the data as a data for communication if the data is present. Since the data for communication is not present just after the initiation of the distance measurement, a dummy data is prepared as a data for communication (S 71~S 73). Then, the CPU 810 makes selection of the optical path using the optical path switch 115 (S 74). This is because it is necessary to subtract the length of the inside optical path from the length of the distance measuring optical path in order to obtain a desired distance. Since the distance measurement is carried out by measuring two wave lengths of the frequencies of 300 kHz and 15 MHz, the irradiation luminous flux being PSK modulated at 300 kHz is firstly irradiated toward the reflecting section 102 (S 75). This PSK modulation is for simultaneously carrying out both the distance measurement and the data communication, during which the data transmitted under the pals modulation is the data for communication previously prepared. Then, the light amount is adjusted by the light amount controller 116 to a value set previously in order to minimize the dispersion of the measured values caused by a degree of light amount (S 76). Measurement is initiated after the adjustment of light amount having been completed.

The address is shifted based on the value of transmission data to which the measurement is initiated (S 77). Then, the number of adding of the signal to be measured which has been A/D converted is counted (S 78), the address is counted by the address counter in order to designate the place to be stored (S 73) and the address is shifted by the address shifter. Then, the A/D conversion is initiated (S 80). The A/D converted data is added to the old address data designated by the address shifter (S 81). The added data is stored in the designated address as a new value (S 82). This operation is repeated 50 times (corresponding to one cycle of the 300 kHz signal) (S 83). When the adding number reaches to nine (9) times (corresponding to 1 bit) (B 84), the steps to this point of time are repeated by a predetermined bit number (corresponding to 1 frame) (S 85). Although this bit number is described as a whole transmission data (corresponding to 1 frame) in the flowchart, it may be set at a bit number corresponding to the number of the transmission data (corresponding to several frames). In addition, it is not necessary to set the bit number at a multiple of integer.

After completion of these processes, the equalization of data is carried out as to every address (S 86). Then, it is carried out to apply Fourier transformation to the equalized data row by the phase detecting means, to detect the phase difference between the signal to be measured and the reference signal in the body, and to convert the phase difference to the distance data (S 87).

Then the modulation of the irradiating light is switched to a continuous modulation of 15 MHz and a distance measurement of 15 MHz is carried out (S 88).

Although the flowchart of FIG. 11 shows an example of conventional distance measuring method in which the distance measurement is carried out after the frequency (15 MHz) of the light-receiving signal has been beat down to a signal of 300 kHz, it is possible to carry out the distance measurement in accordance with a digital data processing similarly to the distance measurement according to the PSK modulation of 300 kHz.

Then, whether or not the distance measurement is completed is discriminated. If the distance measurement has been completed, computing of the length of the optical path is carried out by using the measured data obtained by distance measurement based on signals of both 300 kHz and 15 MHz. After having measured the length of the optical path respectively of the distance measuring optical path and the inside optical path, the CPU 810 computes the distance from the apparatus body to the reflecting section by subtracting the value of the length of the inside optical path from the value of the length of the distance measuring optical path and by converting the value obtained by the operation to a distance. This result is prepared for a new communication data (S 89, S 90). Thus, the distance measurement step is completed (S 91).

Although the keying is carried out by the measured result itself in the embodiment described above, the keying may be carried out after having coded the measured distance data. In addition, although shown in this example that the data transmission is carried out with using binary phase informations, it is possible to increase the data transmission speed by further multiplexing the phase informations.

According to the first embodiment, it is possible to simplify the apparatus by using a distance measuring method for simultaneously carrying out the data communication and the distance measurement with the use of a same light source (Second Embodiment)

Figure 12:
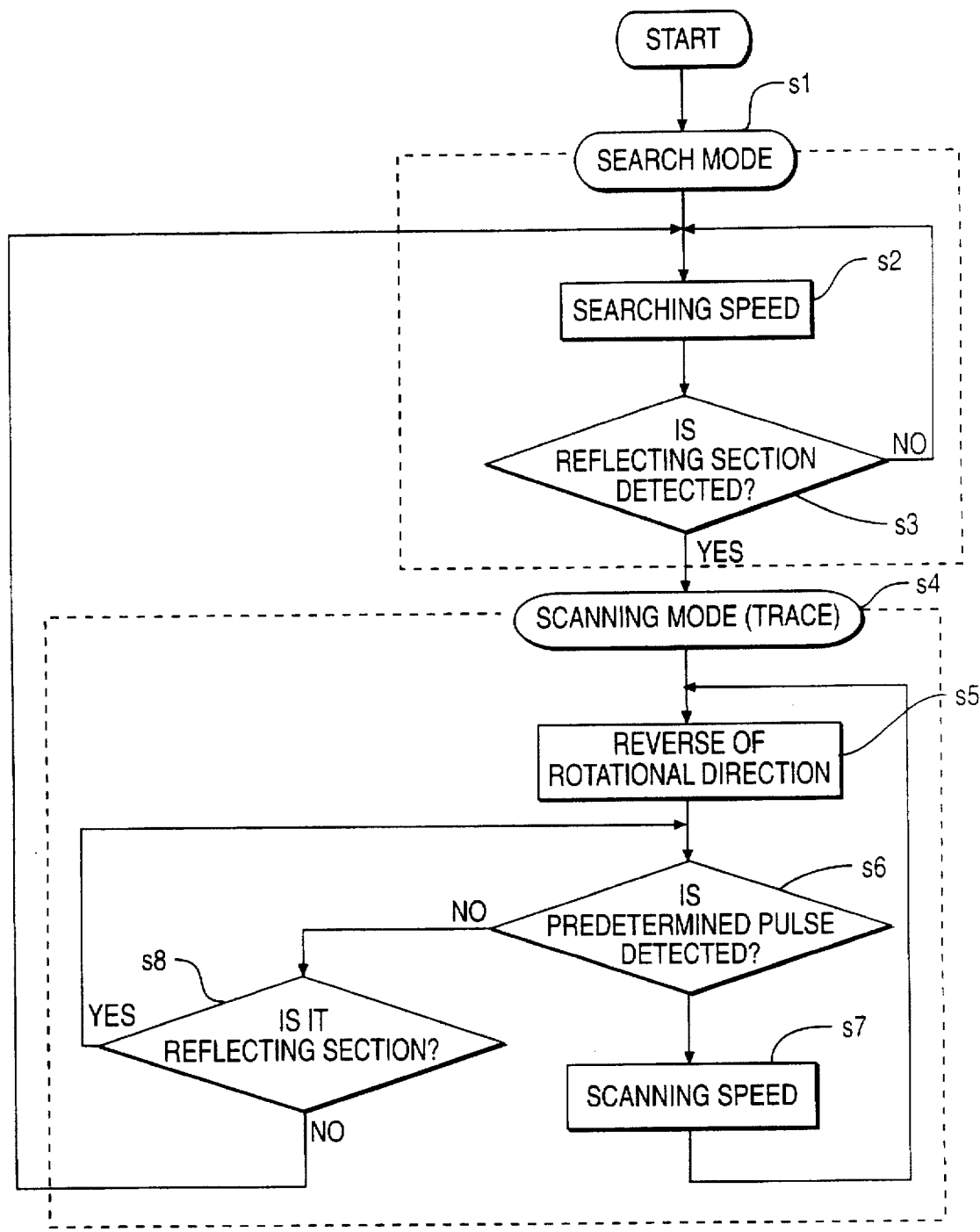
FIG. 12 is a flowchart showing the operation of the second embodiment.
Figure 13:
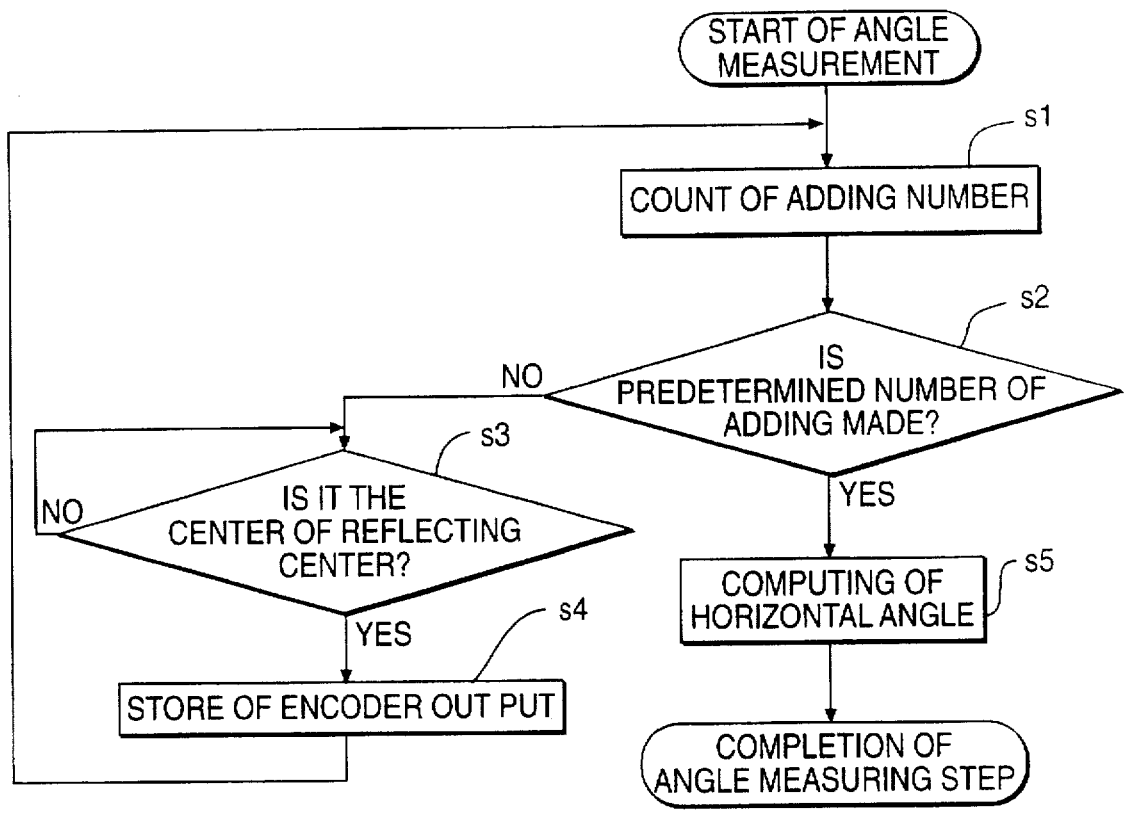
FIG. 13 is a flowchart showing one example of the angle measuring process of the second embodiment.

Then, a second embodiment will be described with reference to FIGS. 12~14, in which the distance measurement and the data communication are simultaneously carried out by setting a reference plane with irradiating a luminous flux irradiated from the body section toward the reflecting section 102.

The second embodiment is substantially same as the first embodiment in the arrangement of the apparatus, the electric circuit and the distance measuring method, however different therefrom in the operation of the body section and the controlling method of a distance measuring timing using a CPU.

Although the irradiation luminous flux of the rotational section 101 is controlled so that it directs to the center of the reflecting section 102, the second embodiment adopts a scanning mode operation in which the irradiation luminous flux is scanned along a horizontal reference plane so as to allow the horizontal reference plane being easily confirmed. FIG. 12 is a flowchart showing the operation of the second embodiment.

When the body section is in the search mode (B 1), the position control section 127 sets the rotational speed of the rotational section 101 at a predetermined rotational speed (searching speed) (S 2). Then, it is discriminated whether or not a signal obtained from the detecting section for position control 104 is a reflected signal from the reflecting section 102. It goes to the spanning mode when discriminated as the signal from the reflecting section 102 (S 4).

The scanning mode is a mode in which the rotational section 101 is reciprocated or swung within a predetermined angle and the reflecting section 102 is positioned at the center of the rotational angle. This scanning mode is controlled by a signal obtained by the first and second photoelectric detectors 124 and 126 of the detecting section for position control 104. The position control section 127 goes to the scanning mode and reverses the rotational direction of the rotational section 101 (S 5). Then, whether it crossed the reflecting section 102 or not is discriminated. The discrimination whether or not the reflecting section 102 is scanned is carried out based on whether or not the reflected light from the reflecting section 102 has been obtained as a predetermined pulse (S 6). If the reflecting section 102 has the construction shown in FIG. 5(a), the motor is controlled so that it reverses when the difference signal between the first and-second photoelectric detectors 124 and 126 is lowered below a predetermined level. If the reflecting section 102 has the construction shown in FIG. 5(b), the motor is controlled so that it reverses when 2 pulses of signals are detected, with observing the signal derived from the first photoelectric detector 124. If the reflecting section 102 has the construction shown in FIG. 5(c), the motor is controlled so that it reverses observing 2 pulses of signals are detected, with observing the absolute value of the difference signal between the first and second photoelectric detectors 124 and 126.

When discriminated that the reflecting section 102 is scanned, the motor speed is set at the scanning speed and the scanning operation is repeated with reversing the rotational direction of the rotational section 101. When predetermined pulse cannot be obtained on scanning the reflecting section 102, confirmation whether it is the reflecting Section 102 or not is made (B 8). When the reflecting section is positioned within a predetermined range of rotational angle and the irradiating does not cross the reflecting section 102 yet, it returns to the the discrimination step for detecting the predetermined pulse. When confirmation of the reflecting section 102 is impossible, this means that the reflecting section 102 is not positioned within the range of rotational angle. In this case, it goes to the search mode (S 1) and carries out again the detecting operation of the reflecting section 102. BY which, the laser flux irradiated from the body section is scanned reciprocally and the horizontal reference line having a predetermined length is marked on the irradiated surface.

The distance measurement and the transmission of the measured data are carried out during the scanning mode.

In the scanning mode, since the reflected luminous flux is returned to the body section only when the irradiation luminous flux crosses the reflecting section 102, the signal to be measured is intermittently received at body section side. Accordingly, the CPU controls the distance measuring timing so that the measurement of phase difference can be carried out only during the reflected luminous flux is returned to the body section.

Although the distance measurement and the transmission of the measured data are same as that shown in the flowchart of FIG. 11, the switching of the modulated frequency is made based on the rotational direction of the rotational section 101 For example, when scanning in a right-hand rotation relative to the reflecting section 102, the irradiation luminous flux of 300 kHz PSK modulation is radiated from the body section, and when scanning in a left-hand rotation, the irradiation luminous flux of 15 MHz continuous modulation is radiated from the body section to carry out the distance measurement If requiring an angle measurement, it is carried out in the scanning mode similarly with the distance measurement and the transmission of the measured data. FIG. 13 is a flowchart showing one example of the angle measurement in the scanning mode. The angle measurement is carried out in the scanning mode to obtain as a horizontal angle by storing the encoder output when detected the center of the reflecting section 102 by the center detecting method of previously mentioned, and by equalizing the data obtained by repeating this operation predetermined times, wherein the horizontal angle is computed firstly counting the number of adding (S 1), detecting whether or not the predetermined number or adding has been carried out (S 2), discriminating whether it is the center of the reflecting section 102 (S 3), scoring the encoder output when the center of the reflecting section 102 is detected (S 4), and finally adding the encoder output predetermined times.

This second embodiment is also possible, similarly to the first embodiment, to trace the reflecting section 102 even though it is moved back and forth or right and left so long as it is positioned within the horizontal plane including the luminous flux radiated from the body section during the scanning mode.

Figure 14:
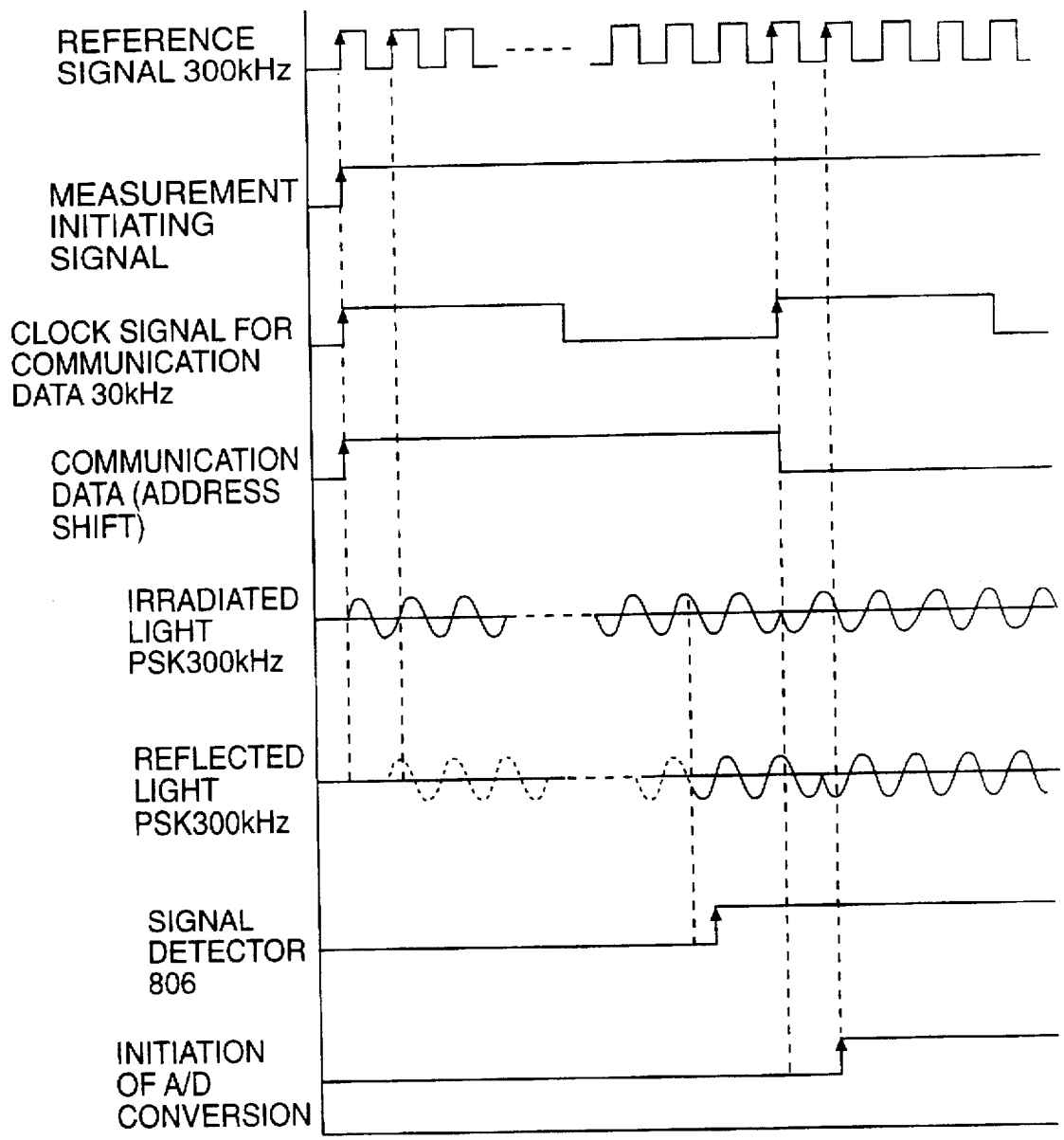
FIG. 14 is a timing chart showing the PSK modulation and the A/D conversion of the second embodiment.

FIG. 14 shows a timing chart of the PSK modulation and the A/D conversion of the second embodiment.

The reception of signal is confirmed by the signal detector 806 since the signal to be measured is intermittently received. The A/D conversion is initiated after "ON" of output of the signal detector 806, after generation of the clock signal of the communication data, and after one clock of the reference signal of 300 kHz. The data processing thereafter is same as the first embodiment.

According to the second embodiment, it is possible to efficiently carry out the surveying operation without securing the reflecting section 102 until the distance measurement is completed, since it can carry out the setting of the reference plane, the distance measurement (if necessary, the angle measurement) and the data communication at the same time without time sharing.

(Third Embodiment)

In the first and second embodiments, the laser beam which is irradiated to the reference plane is used both for the distance measurement and the data communication. However, in order to improve the accuracy of the distance measurement, it is desirable to make conditions of outside lights both in the measurements of distance measuring optical path and the inside optical path same. Also it is preferable that the light source for the distance measurement is low coherent. Accordingly, a third embodiment in which two light sources are used will be described with reference to FIG. 15.

Figure 15:
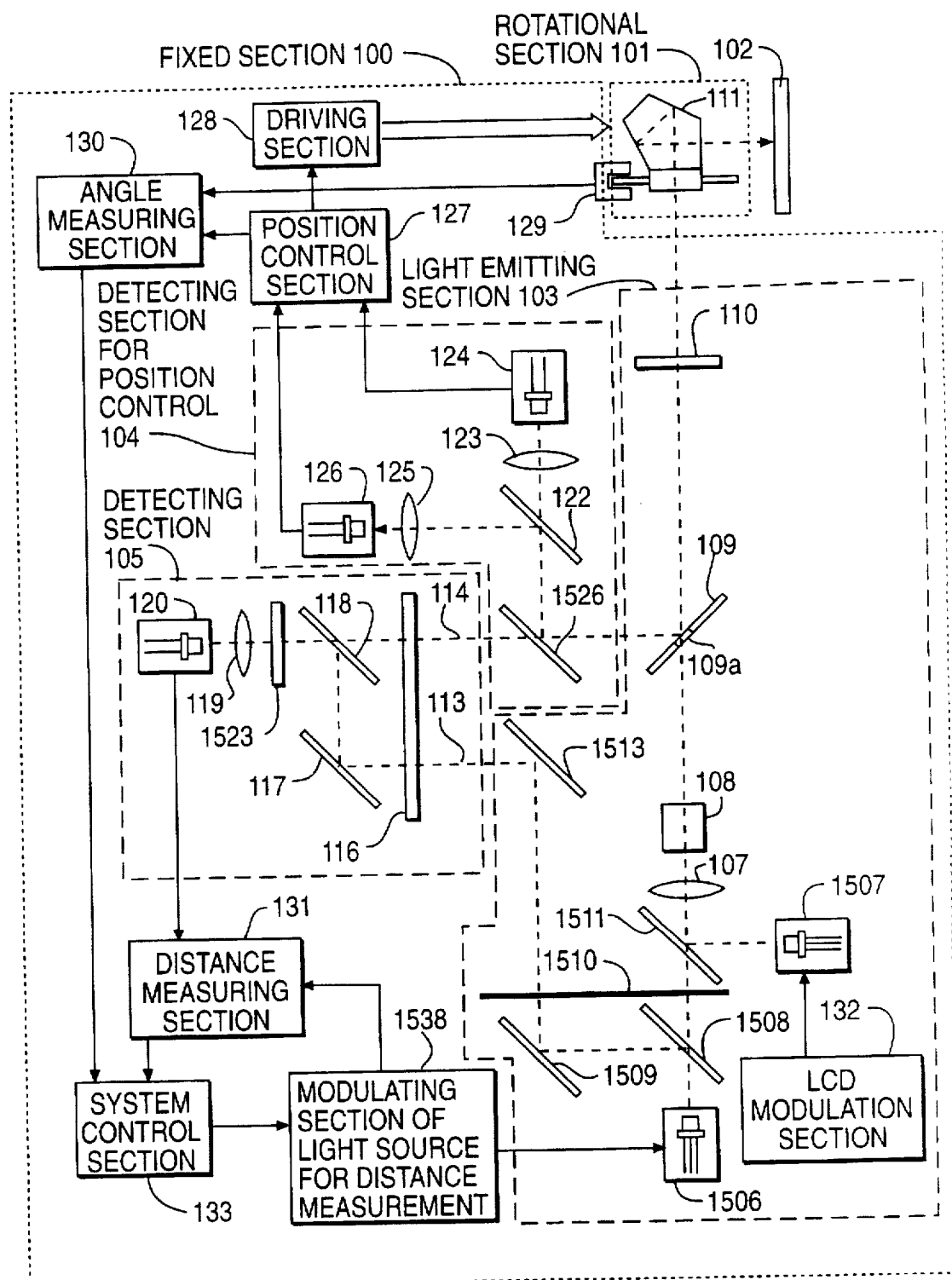
FIG. 15 is a schematic view showing an optical system of the surveying apparatus of a third embodiment of the present invention.

In FIG. 15, same reference numerals will be used for designating the same structural elements and only portions different from the first and second embodiments will be described.

In the third embodiment, a second light source having low coherent characteristics such as a low coherent laser diode (LD), a super luminescent diode (SLD), a light emitting diode (LED) and the like is used for a light source 1509 for the distance measurement and the data communication.

The second light source is a non-visible infrared radiation having a longer wavelength than that of the first light source and the first light source (LD) 1506 is a red light. A dichroic mirror 1511 is a mirror having infrared transmissible and red light reliable characteristics.

The irradiation luminous flux radiated from the second light source 1506 is optically synthesized by the dichroic mirror 1511 with the irradiation luminous flux radiated from the first light source (LD) for irradiating the reference plane 1507 and is irradiated from the body section. In the third embodiment, an optical path switch 1510 is positioned at the light emitting side in order to reduce an influence of the outside lights on light reception for the distance measurement. Half mirrors 1508 and 1509 are arranged between the optical path switch 1510 and the light source 1506, the first light source 1507 is modulated by the LD modulating section, and the second light source is modulated by a modulating section of light source for distance measurement 1538. In addition, there is arranged between the apertured mirror 109 and the light amount controller 114 a dichroic mirror 1526 as a wavelength dividing element to separate the red light and the infrared light. A band pass filter 1523 for removing noisy lights is arranged between the collimator lens 119 and the half mirror 118. Furthermore, a mirror 1513 for deflecting the optical path is arranged between the mirror 1509 and the light amount controller 116.

The distance measurement with directing the luminous flux toward the center of the reflecting section 102 can be carried out by the same method as that of the first embodiment, and the distance measurement with using the scanning mode can be carried out by the sane method as that of the second embodiment. Accordingly, further description as to these methods for measuring the distance will be omitted.

As described above, the irradiation luminous flux is the polarized irradiation light, and the detection of the object reflector and the measurement of a distance therefrom are carried out based on the polarized/reflected luminous flux of which polarized direction is changed when reflected by the object reflector. Thus, it is possible to improve the reliability both of the detection of the object reflector and of the distance measurement.

In addition, according to the present invention, it is possible to know whether the object reflector is within a predetermined range without moving the irradiation luminous flux.

What is claimed is:

1. A surveying apparatus for detecting an object reflector and measuring a distance from the object reflector based on luminous flux reflected by the object reflector, by irradiating luminous flux toward the object reflector as incident rays of light, the object reflector varying direction of polarization of reflected rays of light relative to that of the incident rays of light, the surveying apparatus comprising:

a light source section for radiating luminous flux having a predetermined direction of polarization;

an irradiating optical system for directing the luminous flux radiated by the light source section toward the object reflector;

a polarizing optical element for isolating polarized luminous flux reflected by the object reflector and having a direction of polarization varied by the object reflector;

a first light-receiving section for receiving the polarized luminous flux isolated by the polarizing optical element;

a second light-receiving section for receiving luminous flux reflected by the object reflector;

a detecting section for detecting the object reflector based on an output signal from the first light-receiving section; and a distance measuring section for measuring a distance from the object reflector based on an output signal from the second light-receiving section.

2. A surveying apparatus according to claim 1, wherein:

the light source section has a semiconductor laser and a λ/4 plate, the semiconductor laser radiating linearly polarized light, the λ/4 plate converting the linearly polarized light to circularly polarized light;

the luminous flux polarized into circularly polarized light is directed toward the object reflector;

the object reflector has a λ/4 plate as a polarizing element for varying direction of polarization and reflects the circularly polarized light after changing the polarization thereof to an opposite direction;

the λ/4 plate of the light source section converts the circularly polarized light reflected by the object reflector into linearly polarized light having a direction of polarization perpendicular to the linearly polarized light radiated from the semiconductor laser; and the polarizing optical element comprises a polarized beam splitter for isolating a reflected polarized luminous flux of the linearly polarized light perpendicular to the linearly polarized light of the semiconductor laser.

3. A surveying apparatus according to claim 1, wherein the second light-receiving section receives the luminous flux reflected by the object reflector while it receives luminous flux not reflected by the object reflector directly from the light source section; and the distance measuring section measures a distance from the object reflector based on a phase difference between a signal obtained when the luminous flux reflected by the object reflector is received and a signal obtained when the luminous flux from the light source section is directly received.

4. A surveying apparatus for detecting an object reflector and measuring a distance from the object reflector, based on luminous flux reflected by the object reflector by irradiating luminous flux as incident rays of light toward the object reflector having reflecting surfaces formed by two polarizing elements having different polarizing characteristics, the object reflector varying direction of polarization of part of the incident rays of light, the surveying apparatus comprising:

a light source section for radiating polarized luminous flux having a predetermined direction of polarization;

an irradiating optical system for directing the polarized luminous flux toward the object reflector;

a beam splitter for dividing a reflected luminous flux reflected by the object reflector into a first polarized luminous flux having one direction of polarization and a second polarized luminous flux having another direction of polarization;

a first light-receiving section for receiving the first polarized luminous flux divided by the beam splitter;

a second light-receiving section for receiving the second polarized luminous flux divided by the beam splitter;

a third light-receiving section for receiving the polarized luminous flux reflected by the object reflector and not passing through the beam splitter; a detecting section for detecting the object reflector based on output signals from the first and second light-receiving sections; and a distance measuring section for measuring a distance from the object reflector based on an output signal from the third light-receiving section.

5. A surveying apparatus according to claim 4, wherein:

said light source section has a semiconductor laser for radiating linearly polarized light and a λ/4 plate for converting the linearly polarized light to circularly polarized light;

the polarized luminous flux of the circularly polarized light is directed toward the object reflector;

the object reflector comprises a first reflecting portion for keeping and reflecting the circularly polarized light of the polarized luminous flux incident thereupon and a second reflecting portion having a λ/4 plate for reflecting the polarized luminous flux as circularly polarized light opposite in direction to the circularly polarized light of the polarized luminous flux incident thereupon; and the luminous flux reflected by the object reflector is transformed into a first polarized luminous flux and a second polarized luminous flux, the first polarized luminous flux being a linearly polarized flux of light perpendicular in direction of polarization to the linearly polarized luminous flux radiated from the semiconductor laser through the λ/4 plate, the second polarized luminous flux being a linearly polarized flux of light of the same direction of polarization as the linearly polarized luminous flux radiated from the semiconductor laser.

6. A surveying apparatus for detecting an object reflector and measuring a distance from the object reflector based on luminous flux reflected by the object reflector, by irradiating luminous flux toward the object reflector as incident rays of light, the object reflector varying direction of polarization of reflected rays of light relative to that of the incident rays of light, the surveying apparatus comprising:

- a first light source section for radiating an irradiation luminous flux having a first wavelength and a predetermined direction of polarization to detect the object reflector;
- a second light source section for radiating an irradiation luminous flux having a second wavelength longer than the first wavelength to measure a distance from the object reflector;
- an irradiating optical system for directing the luminous fluxes radiated by the first and second light source sections toward the object reflector;
- a wavelength separating element for separating reflected luminous flux having the first wavelength from the reflected luminous flux having the second wavelength;
- a polarizing optical element for separating a reflected polarized luminous flux having a direction of polarization varied by the object reflector, from the reflected luminous flux having the first wavelength and separated by the wavelength separating element;
- a first light-receiving section for receiving the reflected polarized luminous flux separated by the polarizing optical element;
- a second light-receiving section for receiving the reflected luminous flux having the second wavelength;
- a detecting section for detecting the object reflector based on an output signal from the first light-receiving section; and
- a distance measuring section for measuring a distance from the object reflector based on an output signal from the second light receiving section.

7. A surveying apparatus according to claim 6, wherein said polarizing optical element separates the reflected luminous flux having the first wavelength and separated by the wavelength separating element into a first polarized luminous flux having a direction of polarization varied by the object reflector and a second polarized luminous flux having a different direction of polarization than the first polarized luminous flux; and the first light-receiving section comprises a first light-receiving element for receiving the first polarized luminous flux and a second light-receiving element.

8. A surveying apparatus according to claim 6, wherein said second light source section radiates a luminous flux having a predetermined direction of polarization or a luminous flux having no polarized light.

9. A surveying apparatus according to any one of claims 1, 4 and 6, wherein said irradiating optical system has a prism rotatable about a vertical axis, the irradiated luminous flux being rotated upon the vertical axis.

10. A surveying apparatus according to claim 4, wherein the luminous flux radiated from the light source section comprises modulated light; and the distance measuring section measures the distance from the object reflector based on a phase delay of a light-receiving signal.

11. A surveying apparatus according to claim 6, wherein the luminous flux radiated from the second light source section comprises modulated light; and the distance measuring section measures the distance from the object reflector based on a phase delay of a light-receiving signal.

12. A surveying apparatus according to any one of claims 1, 4 and 6, wherein the irradiating optical system is arranged so that it rotationally scans the luminous fluxes radiated from the light source sections within a reference plane and swings the radiated luminous fluxes in a direction of the object reflector when the object reflector is detected by an output of the first detecting section; and the distance measuring section measures the distance from the object reflector when the irradiating optical system swings the radiated luminous fluxes.

* * * * *